US009469359B2

(12) United States Patent
Abildtrup

(10) Patent No.: US 9,469,359 B2
(45) Date of Patent: Oct. 18, 2016

(54) METHOD AND APPARATUS FOR A REMOVABLE MOTORCYCLE SEAT BACK

(71) Applicant: Brad Abildtrup, Winterset, IA (US)

(72) Inventor: Brad Abildtrup, Winterset, IA (US)

(*) Notice: Subject to any disclaimer, the term of this patent is extended or adjusted under 35 U.S.C. 154(b) by 0 days.

(21) Appl. No.: 13/826,802

(22) Filed: Mar. 14, 2013

(65) Prior Publication Data
US 2014/0265469 A1 Sep. 18, 2014

(51) Int. Cl.
*B62J 1/28* (2006.01)
(52) U.S. Cl.
CPC ............. *B62J 1/28* (2013.01); *Y10T 29/49815* (2015.01)
(58) Field of Classification Search
CPC .......................................................... B62J 1/28
USPC .............. 297/230.1, 352, 215.12; 280/288.4; 224/423, 413
See application file for complete search history.

(56) References Cited

U.S. PATENT DOCUMENTS

| | | | | |
|---|---|---|---|---|
| 3,791,563 A * | 2/1974 | Raat | ........................... | B62J 7/04 224/413 |
| RE33,178 E * | 3/1990 | Ahlberg | ..................... | 280/801.2 |
| 4,993,731 A * | 2/1991 | Fuller | ........................ | B62J 1/28 280/202 |
| 5,356,201 A * | 10/1994 | Olson | .................... | A47C 7/402 297/352 |
| 5,501,168 A * | 3/1996 | Zachary | ................ | B63B 35/731 114/363 |
| 6,484,914 B1 * | 11/2002 | Willey | .......................... | 224/413 |
| 6,966,471 B1 * | 11/2005 | Wilson et al. | ................. | 224/413 |
| 7,661,761 B1 * | 2/2010 | Ortega | ........................... | 297/352 |
| 8,382,137 B2 * | 2/2013 | Nusret | ....................... | 280/288.4 |
| 8,491,055 B2 * | 7/2013 | Freer, II | ................. | B60N 2/245 297/411.25 |
| 2009/0115231 A1 * | 5/2009 | Davis et al. | ............. | 297/215.12 |

* cited by examiner

*Primary Examiner* — Milton Nelson, Jr.
(74) *Attorney, Agent, or Firm* — McKee, Voorhees & Sease, PLC

(57) ABSTRACT

An improved removable seat back for a motorcycle including a cushion, a frame, the frame including an upper portion secured to the cushion and a lower portion having a pair of frame supports, and a pair of frame connection members. Each of the frame connection members includes a connection member upper portion and a connection member lower portion. The connection member upper portion is preferably rotatably secured to one of the frame supports with a pin and slot arrangement and the connection member lower portion generally includes a first securement point and a second securement point where at least one of the securement points is preferably a groove and one preferably includes a clip. When no longer needed, the seat back is removed by disconnecting the frame connection members from the motorcycle, rotating them and storing them in a saddlebag.

19 Claims, 6 Drawing Sheets

METHOD AND APPARATUS FOR A REMOVABLE MOTORCYCLE SEAT BACK

FIELD OF THE INVENTION

This invention relates generally to motorcycle parts, and more specifically to a removable motorcycle seat back. The removable motorcycle seat back of the present invention includes features that make it easier to store and handle.

BACKGROUND OF THE INVENTION

As stated above, the present invention relates to a motorcycle part, specifically a removable motorcycle seat back. Currently, a typical motorcycle may include one or more seats. Typically, though not exclusively, a motorcycle seat back is employed when the motorcycle includes a second seat for a second passenger. When a second passenger is not riding on the motorcycle, the driver of the motorcycle may desire to remove the seat back for aesthetic or other reasons. For example, often the seat back will be placed on the motorcycle instead of a storage compartment.

When the seat back is removed, it currently must be stored away from the motorcycle. This is because the rigid frame of the seat back is presently not adaptable for storage in small spaces. For example, many motorcycles include storage compartments on their side which are commonly referred to as saddlebags. It would be desirable to be able to transport a seat back in a saddlebag such that a motorcyclist can travel without the seat back when riding solo and put the seat back into place when picking up a passenger. Often, riders may pick up a passenger during the ride that they did not anticipate joining them before leaving on the ride.

Because current seat backs must be stored away from the motorcycle, the decision as to whether or not to add the seat back must typically be made before the rider leaves on a ride. Thus, with current seat back designs, the rider is unable to add a passenger and provide them with the comfort of a seat back unless the seat back is added at the start of a ride. It is therefore desirable to have a removable motorcycle seat back which may be stored on the bike and easily added as desired.

FEATURES OF THE INVENTION

A general feature of the present invention is an improved removable motorcycle seat back and method of installing the same which addresses some of the issues with the prior art.

A further feature of the present invention is the provision of an improved motorcycle seat back which is easy to remove.

Another feature of the present invention is the provision of an improved motorcycle seat back which is easy to store.

Still another feature of the present invention is the provision of an improved motorcycle seat back which may be folded for easy storage.

Yet another feature of the present invention is the provision of an improved motorcycle seat back which is safe to use.

SUMMARY OF THE INVENTION

The present invention generally comprises an improved removable seat back for a motorcycle including a cushion, a frame, the frame including an upper portion secured to the cushion and a lower portion having a pair of frame supports, and a pair of frame connection members. Generally, each of the frame connection members includes a connection member upper portion and a connection member lower portion. The connection member upper portion is preferably rotatably secured to one of the frame supports and the connection member lower portion generally includes a first securement point and a second securement point. The frame of the motorcycle may be manufactured of a single piece and is preferably made from tubular steel.

Preferably, the frame connection member is also manufactured from steel or a similarly rigid material. The upper portion of the frame connection member may include a tube that matingly fits to the frame support. For example, the frame support may be tubular and have a diameter slightly less than the diameter of the connection member upper portion tube or vice versa. Preferably, the connection member upper portion tube also includes a transfer slot. A pin preferably located on the frame support fits within the transverse slot on the connection member upper portion tube. This allows the connection member to be rotated in the transverse direction for easy storage. The pin can be spring loaded such that the connection member can be removed completely from the frame. Alternatively, an additional vertical slot can be added where the vertical slot is connected to the transverse slot such that the pin may be slid through the vertical slot and into the transverse slot. Alternatively still, the pin can be welded or otherwise secured to the frame support after the frame support has been inserted into the connection member so that the connection member is not removable from the frame.

The frame support may be planar or another desired shape and typically includes a first securement point and a second securement point. The first securement point may be a groove, hole or trough designed to slide into, around, or through a receiving member on the motorcycle. A second securement point may also be a groove, slot or trough, but preferably includes a clip to minimize the chance for inadvertent removal of the seat back during a ride.

When the seat back of the present invention is no longer needed, the seat back may be removed by disconnecting the frame connection members from the motorcycle. The frame connection members may then be rotated such that the motorcycle seat back may be stored in a saddlebag. Preferably, the frame connection members are rotated to be generally within the width of the cushion or approximately 90 degrees. Thus, the removable seat back of the present invention may be easily stored and handled.

DETAILED DESCRIPTION OF THE PREFERRED EMBODIMENTS

The present invention will be described as it applies to its preferred embodiment. It is not intended that the present invention be limited to the described embodiment. It is intended that the invention cover all modifications and alternatives, which may be included within the spirit and scope of the invention.

Figure 1:
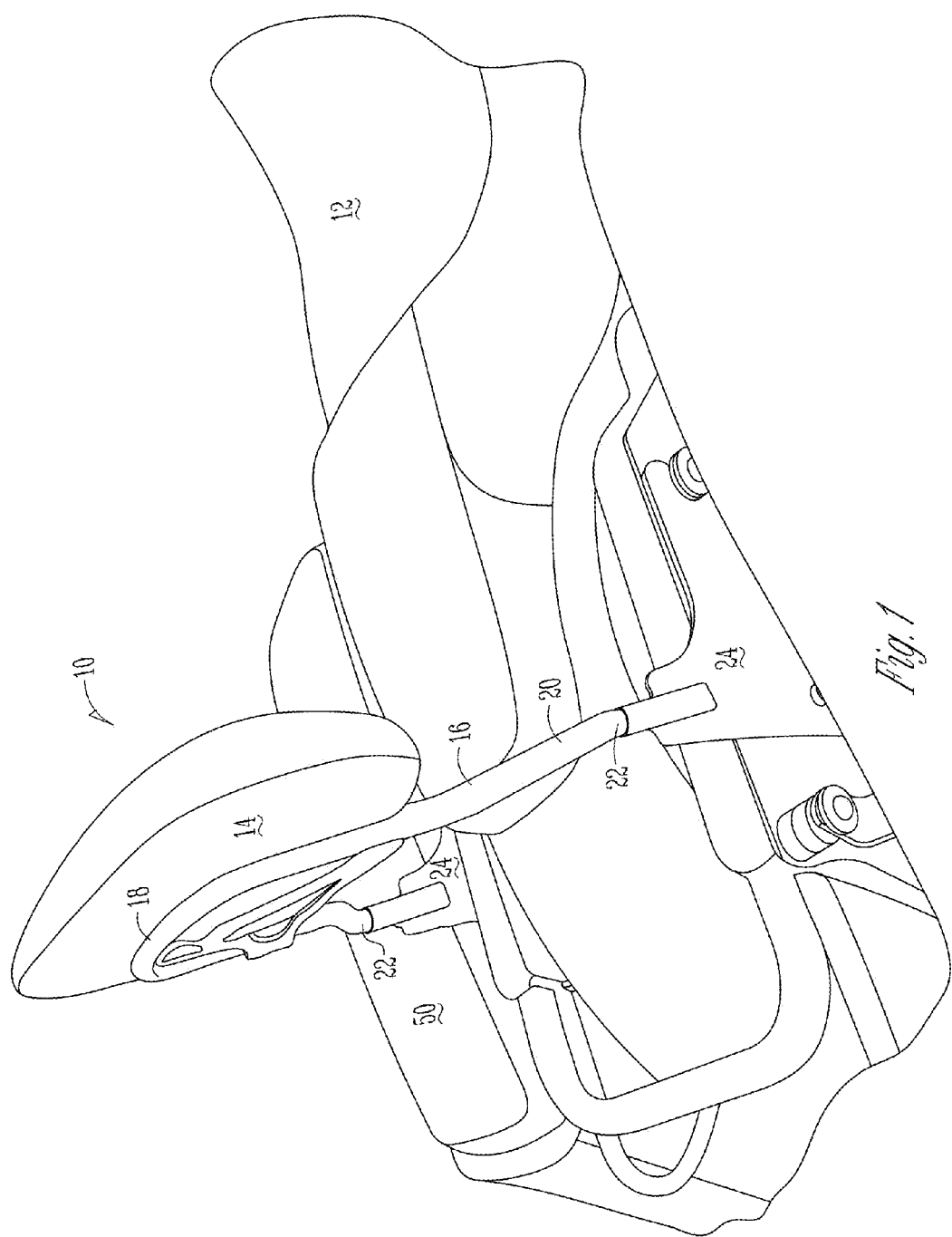
FIG. 1 is a perspective view of an embodiment of the improved removable motorcycle seat back of the present invention as installed on a motorcycle.
Figure 2:
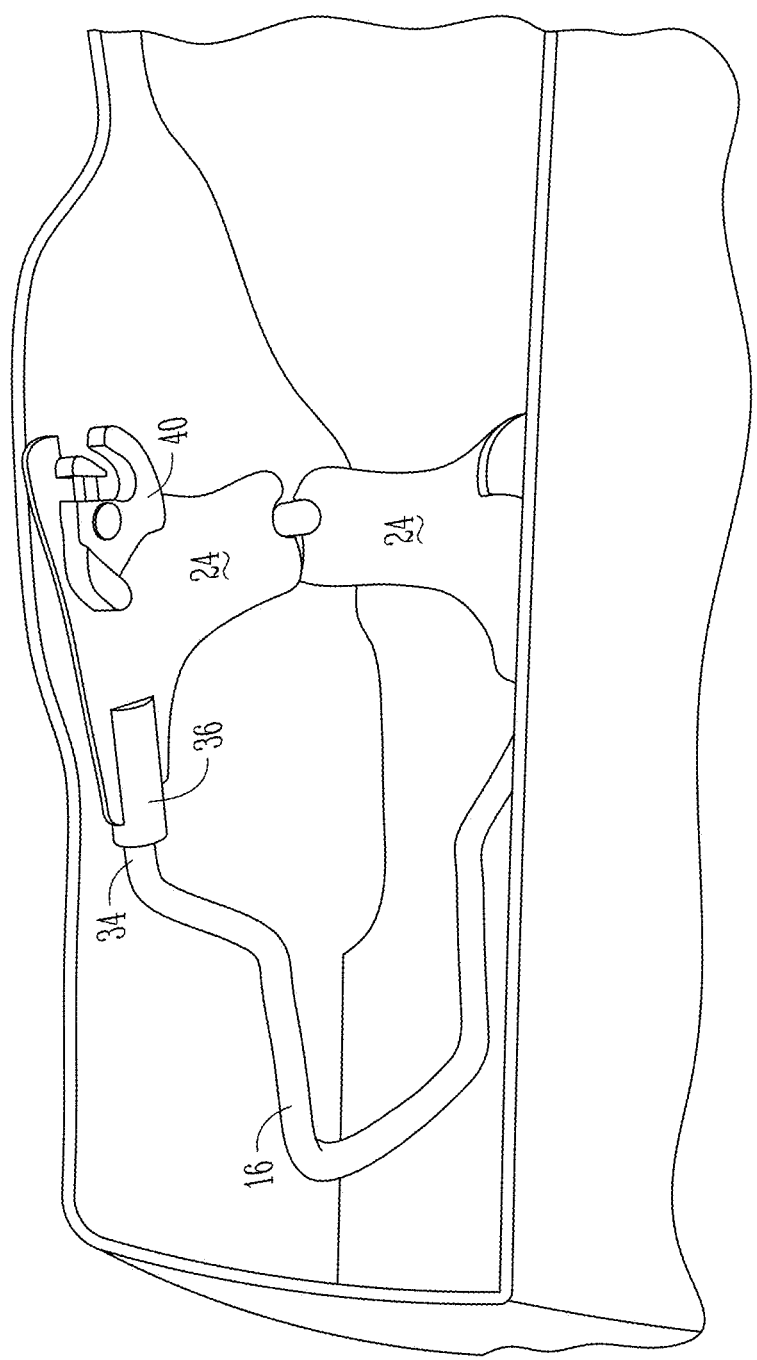
FIG. 2 is a rear view of the frame of an embodiment of the present invention with the frame connection members rotated for storage.

Referring to the drawings, FIGS. 1-5 generally illustrate a preferred embodiment of the present invention. As shown in FIG. 1, preferably the removable motorcycle seat back 10 of the present invention is secured to a motorcycle 12. The removable motorcycle seat back 10 of the present invention preferably includes a cushion 14 secured to a frame 16 about the frame upper portion 18. The cushion 14 may be secured to the frame upper portion 18 through screws, glue or other arrangements. Alternatively still, the cushion 14 may be slip fit over the upper portion 18 of the frame for easy removal and storage.

Figure 3:
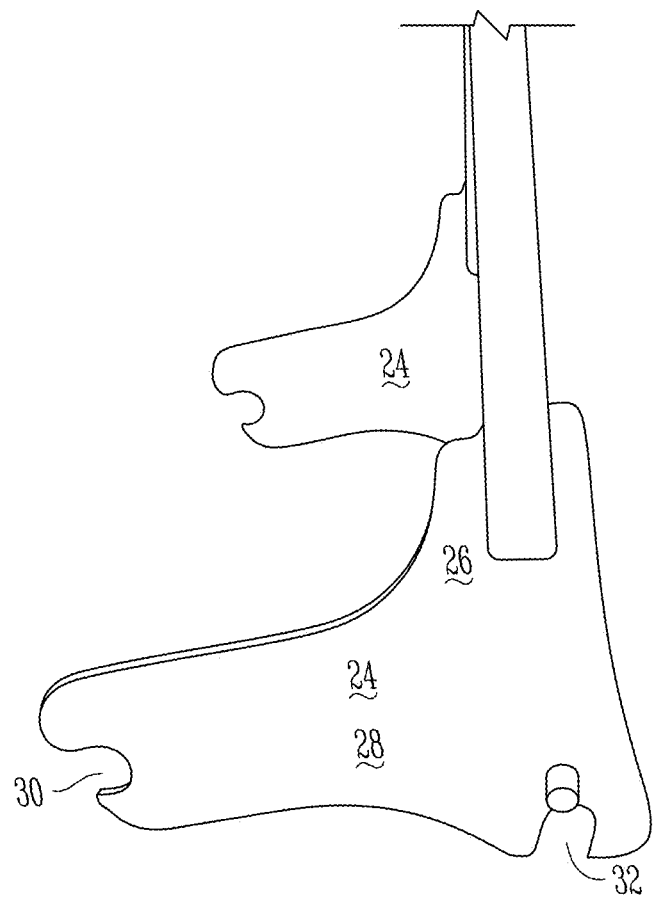
FIG. 3 is a side view of a close-up of an embodiment of the frame connection member of the present invention.
Figure 4:
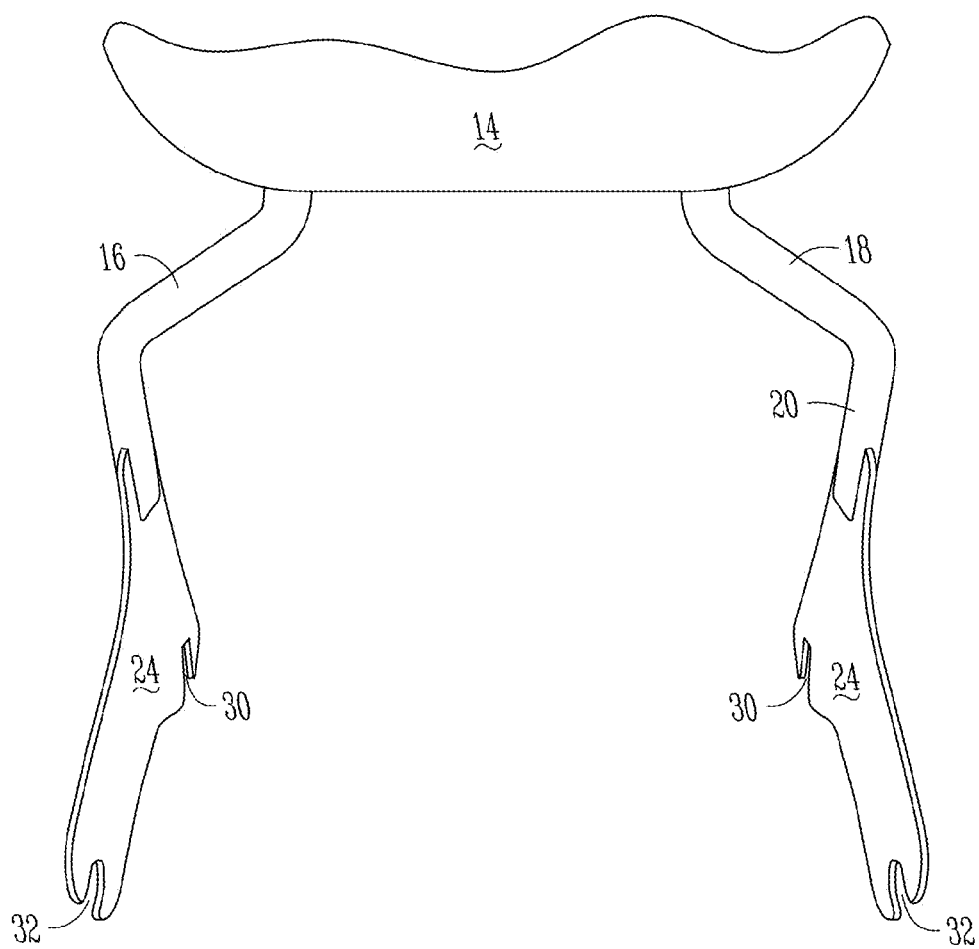
FIG. 4 is a front view of FIG. 3.

The frame 16 also includes a frame lower portion 20 which terminates in a pair of frame supports or legs 22. As shown in FIGS. 3 and 4, the frame supports/legs 22 are secured to a frame connection member 24. The frame connection member 24 includes a connection member upper portion 26 and a connection member lower portion 28. The connection member 24 may generally be made from a plate of steel, though the connection member 24 may be any desired shape.

Figure 5:
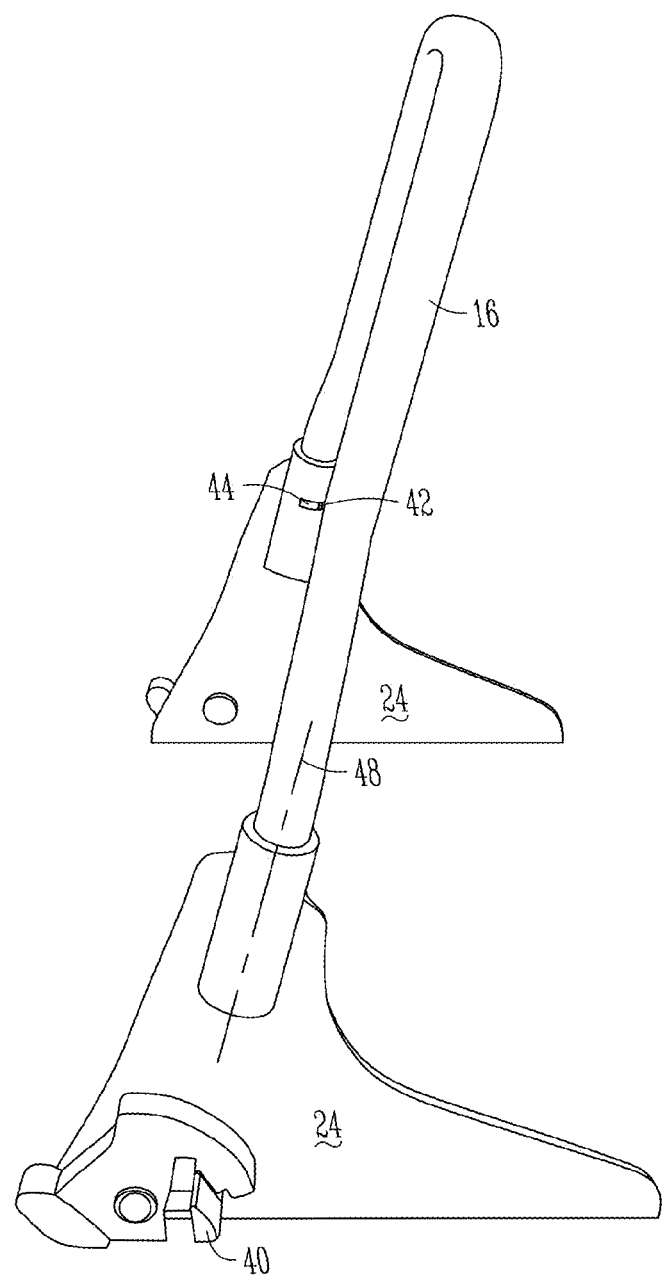
FIG. 5 is a side view of an embodiment of the frame connection member and frame of the present invention.

The connection member lower portion 28 is designed to provide stability and thus typically is secured to the motorcycle at least two locations. Preferably, the lower portion 28 of the frame connection member 24 includes a first securement point 30 and a second securement point 32. The first securement point 30 may be a slot as shown or a groove, hole or other shape designed to be received on the motorcycle 12. The second securement point 32 is also designed to be received on the motorcycle 12. As shown in FIG. 3, the second securement point 32 may also be a groove. As shown in FIG. 5, a clip 40 is preferably secured to the lower portion 28 around the second securement point 32. The clip 40 holds the frame connection member 24 securely to the motorcycle 12 and also allows for easy removal by the user.

Figure 6:
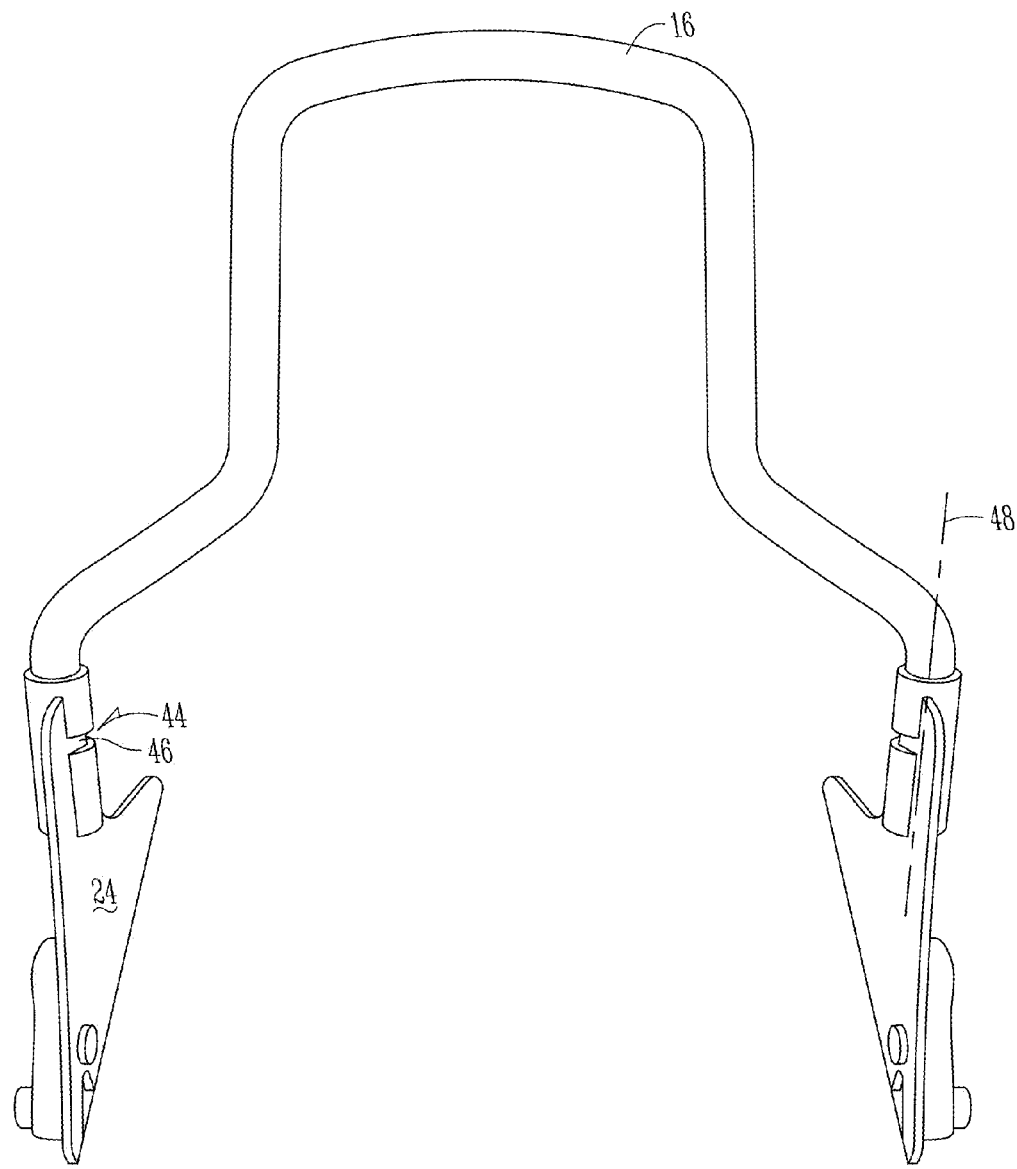
FIG. 6 is a rear view of an embodiment of the frame and frame connection member of the present invention.

As shown in FIG. 6, the connection member upper portion 26 preferably includes a connection member upper portion tube 36 which is adapted to receive or be received by a frame support tube 34. For example, the interior diameter of the connection member upper portion tube 36 is preferably larger than the outer diameter of the frame support tube 34 allowing the frame support tube 34 to fit inside of the connection member upper portion tube 36. The diameters can be reversed such that the connection member upper portion tube 36 fits inside the frame support tube 34 if desired. This allows the connection member 24 to rotate about the frame support or leg 22 and thus allows the folding of both frame connection members 24 for ease of storage.

Preferably, the rotation of the connection members 24 is controlled and limited by the use of a transverse slot 44. A pin 42 is secured to the frame support or leg 22 and travels transversely within the slot 44. The pin 42 may be permanently affixed by welding or other means. Alternatively, the pin 42 may be moveably secured to a spring, which is contained within the frame support or leg 22 and allows the pin 42 to move in and out of a hole in the leg 22. In this manner, the pin 42 may be easily inserted or removed from a transverse slot 44 in the frame connection member 24 and the frame 16 may be separated from or attached to the frame connection member 24. Alternatively, the frame connection member 24 may include a vertical slot 46 which would be connected to the transverse slot 44 and to the outer edge of the connection member upper portion 26.

The rotation of the connection members 24 about the legs 22 may be controlled in other ways, such as including a hinge assembly with an end pin that joins the connection member 24 to the leg 22. Any means for rotation of the connection member 24 about the leg 22 around their common axis 48 may be used.

When desired, the user may remove the seat back 10 from the motorcycle 12 by disconnecting the frame connection members 24 from the motorcycle 12 to remove the motorcycle seat back 10. The frame connection members 24 can then be rotated about the axis 48 shared with the legs 22 to preferably lie flat and be within the width of the cushion 14 or at least forty five degrees. After folding, the seat back 10 can be stored in the saddle bag 50.

A general description of the present invention as well as a preferred embodiment of the present invention has been set forth above. Those skilled in the art to which the present invention pertains will recognize and be able to practice additional variations in the methods, systems and apparatuses described which fall within the teachings of this invention. Accordingly, all such modifications and additions are deemed to be within the scope of the invention which is to be limited only by the claimed appended hereto.

What is claimed is:

1. An improved removable seat back for a motorcycle, the seat back comprising:
   a cushion;
   a frame, the frame including an upper portion secured to the cushion and a lower portion having a pair of frame supports;
   a pair of frame connection members, each frame connection member including a connection member upper portion and a connection member lower portion, the connection member upper portion being rotatably secured to one of the frame supports and the connection member lower portion including a first securement point and a second securement point;
   wherein the connection member upper portion and the frame support to which it is secured share a common longitudinal axis, and wherein the frame connection member upper portion is rotatable about said axis; and
   wherein the pair of frame connection members are configured to be rotated about the frame supports and lie flat within the width of the cushion when in a storage configuration, and the pair of frame connection members are configured to be rotated about the frame supports such that they are generally perpendicular to the upper portion of the frame when secured to the motorcycle.

2. The seat back of claim 1 wherein the frame is a single piece.

3. The seat back of claim 1 Wherein the pair of frame supports comprise a frame support tube having an outer diameter and the connection member upper portions each include a connection member upper portion tube having an inner diameter greater than the outer diameter of the frame support tube.

4. The seat back of claim 1 wherein the frame is steel.

5. The seat back of claim 1 wherein the second securement point further comprises a clip.

6. The seat back of claim 1 wherein the frame connection member is planar.

7. The seat back of claim 1 wherein the frame support includes a pin and the connection member upper portion includes a transverse slot wherein the pin may move in the transverse direction.

8. The seat back of claim 7 further comprising a vertical slot in the connection member upper portion, the vertical slot providing the pin access to the transverse slot.

9. The seat back of claim 7 wherein the pin is removable.

10. The seat back of claim 7 wherein a spring is secured to the pin.

11. A removable seat back for a motorcycle, the removable seat back comprising:
   a cushion;
   a tubular frame including an upper portion secured to the cushion and a lower portion including a pair of support legs;
   a pair of frame connection members rotatably secured to the support legs and removably secured to a motorcycle, wherein the frame connection members and the leg to which the frame connection member is rotatably secured share a common axis, wherein said axis is parallel to the leg and wherein the frame connection member is rotatable about said axis;
   wherein the pair of support legs each include a pin and the pair of connection members comprises a connection member upper portion;
   wherein the connection member upper portion includes a transverse slot wherein the pin may move in the transverse direction; and
   a vertical slot in the connection member upper portion, the vertical slot providing the pin access to the transverse slot.

12. The removable seat back of claim 11 wherein the pair of frame connection members are configured to lie flat within the width of the cushion when rotated about the support legs.

13. The removable seat back of claim 11 wherein the frame connection members are secured to the motorcycle with clips.

14. The removable seat back of claim 11 wherein the frame connection members are planar.

15. The removable seat back of claim 11 wherein the frame connection members include a connection member upper portion tube.

16. An improved removable seat back for a motorcycle, the seat back comprising:
   a cushion;
   a frame, the frame including an upper portion secured to the cushion and a lower portion having a pair of frame supports;
   a pair of frame connection members, each frame connection member including a connection member upper portion and a connection member lower portion, the connection member upper portion being rotatably secured to one of the frame supports and the connection member lower portion including a first securement point and a second securement point;
   wherein the connection member upper portion and the frame support to which it is secured share a common longitudinal axis, and wherein the frame connection member upper portion is rotatable about said axis;
   wherein the frame support includes a pin and the connection member upper portion includes a transverse slot wherein the pin may move in the transverse direction; and
   a vertical slot in the connection member upper portion, the vertical slot providing the pin access to the transverse slot.

17. The seat back of claim 16 wherein the pair of frame supports comprise a frame support tube having an outer diameter and the connection member upper portions each include a connection member upper portion tube having an inner diameter greater than the outer diameter of the frame support tube.

18. The seat back of claim 16 wherein the pin is removable and wherein a spring is secured to the pin.

19. The sea back of claim 16 wherein the pair of frame connection members are configured to lie flat within the width of the cushion when rotated about the frame supports.

* * * * *